United States Patent
Ramlow et al.

(10) Patent No.: US 6,207,344 B1
(45) Date of Patent: Mar. 27, 2001

(54) COMPOSITION FOR LASER MARKING

(75) Inventors: Anne Ramlow, Bergen op Zoom; Terence John Lillie, Rotterdam; Theodorus Lambertus Hoeks, Bergen op Zoom, all of (NL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/408,032

(22) Filed: Sep. 29, 1999

(51) Int. Cl.[7] ............... G03C 1/72; G03C 1/705
(52) U.S. Cl. ............ 430/270.1; 430/281.1; 430/286.1; 430/945; 430/941
(58) Field of Search .................. 430/270.1, 346, 430/495, 945, 286.1, 947, 281.1; 524/100, 173; 428/141, 142

(56) References Cited

U.S. PATENT DOCUMENTS

| | | |
|---|---|---|
| 2,999,835 | 9/1961 | Goldberg . |
| 3,028,365 | 4/1962 | Schnell et al. . |
| 3,153,008 | 10/1964 | Fox . |
| 3,169,121 | 2/1965 | Goldberg . |
| 3,334,154 | 8/1967 | Kim . |
| 3,635,895 | 1/1972 | Kramer . |
| 3,978,247 | 8/1976 | Braudy et al. . |
| 4,001,184 | 1/1977 | Scott . |
| 4,018,750 | 4/1977 | Onizawa . |
| 4,123,436 | 10/1978 | Holub et al. . |
| 4,131,575 | 12/1978 | Adelmann et al. . |
| 4,204,047 | 5/1980 | Margotte et al. . |
| 4,316,073 | 2/1982 | Lemelson . |
| 4,396,595 | 8/1983 | Heytmeijer et al. . |
| 4,544,835 | 10/1985 | Drexler . |
| 4,769,310 | 9/1988 | Gugger et al. . |
| 5,194,089 | * 3/1993 | Speer et al. ............... 106/426 |
| 5,340,628 | 8/1994 | McKillip . |
| 5,346,802 | 9/1994 | Ohbachi et al. ............ 430/270.1 |
| 5,350,792 | 9/1994 | Hess et al. .................. 524/117 |
| 5,373,039 | * 12/1994 | Sakai et al. ................. 524/100 |
| 5,422,161 | 6/1995 | Ohbachik et al. ............ 428/141 |
| 5,489,639 | * 2/1996 | Faber et al. ................. 524/417 |
| 5,599,869 | * 2/1997 | Kurz ........................... 524/495 |
| 5,601,661 | 2/1997 | Milstein et al. ............. 136/253 |
| 5,608,429 | 3/1997 | Hayashihara et al. ........ 346/135.1 |
| 5,691,757 | 11/1997 | Hayashihara et al. ........ 347/155 |
| 5,703,709 | 12/1997 | Mori et al. ................... 359/196 |
| 5,798,202 | * 8/1998 | Cushner et al. .............. 430/306 |
| 5,837,429 | 11/1998 | Nohr et al. .................. 430/343 |
| 5,853,955 | 12/1998 | Towfiq ........................ 430/270.12 |
| 5,866,644 | 2/1999 | Mercx et al. ................. 524/449 |
| 5,977,514 | 11/1999 | Feng et al. . |
| 6,017,972 | * 1/2000 | Harris et al. ................. 522/2 |
| 6,022,905 | * 2/2000 | Harris et al. ................. 522/2 |

FOREIGN PATENT DOCUMENTS

WO 94 12352   6/1994 (WO) .
WO 99 25562   5/1999 (WO) .

OTHER PUBLICATIONS

PCT International Search Report for International Application No. PCT/US 00/26536.

* cited by examiner

Primary Examiner—John S. Chu
Assistant Examiner—Yvette M. Clarke

(57) ABSTRACT

A resin composition having laser marking properties comprising a polycarbonate resin, an effective amount of a copper chromite having a spinel structure and up to 0.05% by weight of the total composition of carbon black, wherein said polycarbonate resin foams in laser struck areas to form light colored markings in the laser struck areas on a dark background.

22 Claims, No Drawings

COMPOSITION FOR LASER MARKING

FIELD OF THE INVENTION

The invention relates to a resin composition suitable for marking with a laser and a method for laser marking.

BACKGROUND OF THE INVENTION

The laser beam provides an economic and rapid method of writing, bar coding and decorative marking of plastics. This technique is advantageous over current printing technologies because of the ease at which the layout can be adjusted using graphic computer programs and integrated into a production line. Laser marking methods are processes that use laser light to place characters, such as letters, figures, and symbols, bar codes or images on a surface by irradiating the target surface with laser light. Laser marking is a contact-free procedure; so that marking is possible even on soft, irregular surfaces that are not readily accessible. Laser marking is ink-free, which provides long-lasting applications and it is solvent-free, which makes it friendlier to the environment.

There are several laser types available for marking plastic surfaces. A $CO_2$ laser allows speeds up to 10,000 mm/sec. At 10,600 nm, the $CO_2$ laser enables laser marking by thermochemical reaction, melting, vaporizing and engraving. An Nd:YAG laser allows speeds up to 2000 mm/sec. The Nd:YAG laser at 1064 nm provides laser marking by carbonization, sublimation, discoloration, foaming and engraving. At lower power levels at 532 nm, the Nd:YAG laser marks by leaching or selective bleaching of dyes and pigments. These lasers have good flexibility in text and imaging and broad flexibility in marking based on several phenomena, such as melting, foaming, vaporizing and engraving.

In one type of laser marking, it is desirable to obtain a light and/or colored contrast on a dark background. This type of laser marking can be accomplished by making white markings against a dark background or by using dyes or pigments to create colored markings, such as red, blue or yellow against a dark background. A problem that often occurs with contrasting laser markings is that the dark background pigment will interfere with and dull the brightness of the light pigments or the white laser marking, such as by leaving a grayish or yellowish tint. However, if a sufficient amount of the dark pigment is not used, the intensity of the dark background color decreases and the desired contrast between the light laser markings against the dark background is not achieved. Often, the light pigment colors distort the dark background color so that the color of the light pigment can be recognized in the dark background color.

Carbon black is often used to create a black background color. The irradiation from the laser beam decomposes the carbon black into volatile components. These volatile components as well as the absorption of heat from the laser beam foam the surface, which scatters the light and leaves a lightly colored impression. In order to retain the desired contrast between the light color and the dark background color, carbon black loadings should not exceed about 0.05% of the composition. However, at this level, when striving for colored markings, the dye or pigment distorts the black background color.

U.S. Pat. No. 4,769,310 to Gugger et al. describes a method of laser marking for ceramic materials using an inorganic pigment.

Some prior art laser marking patents use animal charcoal or elemental carbon to create the dark background color, such as U.S. Pat. No. 5,350,792 to Hess et al. (describes a plastic molding composition for laser marking based on an organic thermoplastic polymer containing a black mineral pigment, such as animal charcoal) and U.S. Pat. No. 5,599,869 to Kurz (describes a plastic molding composition for laser marking based on an organic thermoplastic polymer containing a black mineral pigment with elemental carbon and another coloring agent).

U.S. Pat. No. 5,373,039 to Sakai et al. describes a laser marking composition comprising a thermoplastic resin, a compound of tetrazole, azo, sulfonylhydrazide or nitroso, and carbon black.

U.S. Pat. No. 5,866,644 to Mercx, et al. discloses polyester laser marking compositions having light colored markings on a dark background comprising a hydrated metal phosphate and mica.

SUMMARY OF THE INVENTION

There is a need for polycarbonate laser marking compositions providing an improved contrast of light colors on dark backgrounds without distorting the light or background colors.

The present invention provides a resin composition having laser marking properties comprising a polycarbonate resin, an effective amount of a copper chromite having a spinel structure and up to about 0.05% by weight carbon black based on the total composition, wherein said polycarbonate resin foams in laser struck areas to form light colored markings in the laser struck areas on a dark background.

DETAILED DESCRIPTION OF THE PREFERRED EMBODIMENTS

The present invention is based on the discovery that the contrast of light colors on dark backgrounds in laser marking can be enhanced by using an effective amount of a copper chromite having a spinel structure in the background pigment of a polycarbonate composition. The exact nature of the mechanism by which the copper chromite spinel works in the polycarbonate composition is not yet established. It is thought to be due to the dispersibility of the copper chromite spinel within the polycarbonate matrix.

The present invention provides a resin composition having laser marking properties comprising a polycarbonate resin, an effective amount of a copper chromite having a spinel structure and up to about 0.05% by weight carbon black based on the weight of the total composition, wherein said polycarbonate resin foams in laser struck areas to form light colored markings on a dark background.

Another embodiment of the invention is a resin composition having laser marking properties comprising a polycarbonate resin, a marking agent, an effective amount of a copper chromite having a spinel structure and up to about 0.05% by weight carbon black based on the total composition, wherein said polycarbonate resin foams in laser struck areas to form light colored markings in the laser struck areas on a dark background.

The copper chromite spinel has a particle size distribution of about 0.35 to about 5.5 $\mu$m. Examples of copper chromites having a spinel structure are the PIGMENT BLACK CDT 1145 supplied by FERRO® and the BLACK #1 supplied by the Shepherd Color Company. The copper chromite spinel may be used alone or in combination with carbon black to give the desired background color and is present in the composition in an effective amount. When carbon black is included in the composition, the copper chromite spinel is preferably between about 0.05% and about 5% by weight of the total composition. A more preferred range is about 0.1% to about 1% by weight of the total composition and a most preferred range is about 0.2% to about 1% by weight of the total composition.

A preferred embodiment for white laser markings on a black background, is to include only the copper chromite spinel for the background coloring. When carbon black is not included in the composition, the copper chromite spinel should be present within the composition at a minimum level of about 0.5% by weight of the total composition. Preferably, the amount is between about 0.5% and about 5% by weight of the total composition. A more preferred range is about 0.7% to about 1% by weight of the total composition.

The carbon black must be made substantially of carbon. It is possible to use any of various known types of carbon black. Carbon black is generally produced by a furnace process, a contact process or an impact process. Examples that may be cited of the raw material include primarily creosote oil, heavy oil, ethylene bottoms, natural gas, acetylene gas, naphthalene, antracene, petroleum, carbon dioxide and pitch oil. Depending on the method of production and the starting material, this is called variously furnace black, lamp black, thermal black, acetylene black, German furnace black, channel black, roller black, German naphthalene black, gas black and oil black. Two or more carbon blacks may be used. The amount of carbon black should not exceed the amount of about 0.05% by weight of the total composition as higher loadings may interfere with the light laser marked areas. A preferred range of carbon black is about 0.001% to about 0.05% by weight based on the total composition. A more preferred range is about 0.025% to about 0.035% by weight based on the total composition.

The marking agent can be any of the various pigments and dyes that are soluble in the polycarbonate resin. Examples of pigments and dyes which can be used for laser marking in polycarbonate compositions are: pigment yellow 180, solvent yellow 145, solvent yellow 163, solvent yellow 114 and solvent red 135, solvent violet 122, solvent blue 97, solvent green 3, pigment green 7, solvent violet 36, solvent violet 13 and pearl luster pigment.

The marking agent is present in an amount sufficient to provide the desired pigment to the laser marked area. The greater the amount of pigment or dye, the brighter the color in the laser marked area will be. Dyes and pigments are added in amounts from 0% to about 1% by weight based on the total composition. A more preferred range is about 0.001% to about 1.0% by weight of the total composition. A most preferred range is about 0.1% to about 0.3% by weight of the total composition.

Polycarbonates suitable for use in the present invention are any of those known in the art. Especially preferred polycarbonates are the aromatic polycarbonates. The aromatic polycarbonates may be homopolymers, copolymers and mixtures thereof, which have an intrinsic viscosity, as determined in chloroform at 25° C. of from about 0.3 to about 1.5 dl/g, preferably from about 0.45 to about 1.0 dl/g. These polycarbonates may be branched or unbranched and generally, will have a weight average molecular weight of from about 10,000 to about 200,000, preferably from about 20,000 to about 100,000 as measured by gel permeation chromatography.

These aromatic polycarbonates are derived from dihydric phenols, which are mononuclear or polynuclear aromatic compounds containing two hydroxy radicals as functional groups, each of which is attached directly to a carbon atom of an aromatic nucleus. Typical dihydric phenols are: 2,2-bis(4-hydroxyphenyl)propane; hydroquinone; resorcinol; 2,2-bis(4-hydroxyphenyl) pentane; 2,4'-(dihydroxydiphenyl)methane; bis(2-hydroxyphenyl) methane; bis(4-hydroxyphenyl)methane; 1,1-bis(4-hydroxyphenyl)-3,3,5-trimethyl-cyclohexane; fluorine bisphenol, 1,1-bis(4-hydroxyphenyl)ethane; 1,1-bis(4-hydroxyphenyl)cyclohexane; 1,1-bis(3,5-dimethyl-4-hydroxyphenyl)cyclohexane; 1,1-bis(4-dhygroxpyphenyl) cyclododecane; 1,1-bis(4-hydroxyphenyl)decane; 1,4-bis(4-hydroxyphenyl)butane; p,p'-dihydroxydiphenyl; bis(4-hydroxyphenyl)ether; 1,1-bis(4-hydroxyphenyl)-3,3,5-trimethylcyclohexane; 4,4'thiodiphenol; 3,3-bis(4-hydroxyphenyl)pentane; 2,2'-dihydroxydiphenyl; 2,6-dihydroxynaphthalene; bis(4-hydroxydiphenyl)-sulfone; bis (3,5-diethyl-4-hydroxyphenyl)sulfone; 2,2-bis(3,5-dibromo-4-hydroxyphenyl)propane; 2,2-bis(3,5-dimethyl-4-hydroxyphenyl)propane; 2,4'-dihydroxydiphenyl sulfone; 5'-chloro-2,4'-dihydroxydiphenyl sulfone; 4,4'-dihydroxydiphenyl ether; 4,4'-dihydroxy-3,3'-dichlorodiphenyl ether; 2,2-bis(4-hydroxy-3-methylphenyl) propane; 4,4-bis(4-hydroxyphenyl)heptane; 2,2-(3,5,3',5'-tetrachloro-4,4'-dihydroxyphenyl)propane; and (3,3'-dischloro-4,4'-dihydroxyphenyl)methane. Other dihydric phenols that are also suitable for use in the preparation of the above polycarbonates are disclosed in U.S. Pat. Nos. 2,999,835; 3,028,365; 3,334,154 and 4,131,575. It is also possible to employ two or more different dihydric phenols.

The carbonate precursors employed in the practice of the instant invention include the carbonyl halides, the bishaloformates and the diarylcarbonates. The carbonyl halides include carbonyl bromide, carbonyl chloride, and mixtures thereof. Typical of the diarylcarbonates are diphenyl carbonate; di(halophenyl)carbones, such as di(chlorophenyl) carbonate, di(bromophenyl)carbonate, di(trichlorophenyl) carbonate, and di(tribromophenyl)carbonate; di(alkylphenyl)carbonates such as di(tolyl)carbonate; dinaphthyl carbonate; di(halonaphthyl)carbonates; and naphthyl phenyl carbonate. The bishaloformates suitable for use in this invention include the bishaloformates of dihydric phenols such as the bischloroformates of hydroquinone and bisphenol-A; the bishaloformates of glycols, such as the bischloroformates of ethylene glycol, neopentyl glycol and polyethylene glycol.

Aromatic polycarbonates can be manufactured by known processes, such as, reacting a dihydric phenol with a carbonate precursor, such as phosgene, a haloformate or a carbonate ester in accordance with methods set forth in the above-cited literature and U.S. Pat. Nos. 4,018,750 and 4,123,436 or by transesterfication processes, as disclosed in U.S. Pat. No. 3,153,008, as well as other processes known to those skilled in the art. All of the above-mentioned patents are incorporated herein by reference.

The polycarbonates produced are typified as possessing recurring structural units of the formula:

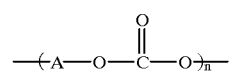

wherein A is a divalent aromatic radical remaining after removal of the hydroxyl groups from the dihydric phenol employed in the polymer producing reaction and n is greater than 1, preferably from about 10 to about 400.

Preferred polycarbonate resins are of the formula:

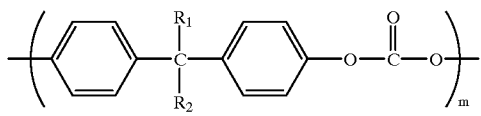

wherein $R_1$ and $R_2$ are independently hydrogen, (lower) alkyl or phenyl and m is at least 30 or preferably between 40 and 300. The term (lower) alkyl includes hydrocarbon groups of from 1 to 6 carbon atoms.

The aromatic polycarbonates utilized in the present invention also include the polymeric derivatives of a dihydric phenol, a dicarboxylic acid, and a carbonic acid, such as disclosed in U.S. Pat. No. 3,169,121, incorporated herein by reference.

Branched polycarbonates, such as are described in U.S. Pat. No. 4,001,184, can be utilized in the practice of this invention, as can blends of linear polycarbonate and a branched polycarbonate. Moreover, blends of any of the above materials may be employed in the practice of this invention to provide the aromatic polycarbonate.

The branched polycarbonates may be prepared by adding a branching agent during polymerization. These branching agents are well known and may comprise polyfunctional organic compounds containing at least three functional groups that may be hydroxyl, carboxyl, carboxylic anhydride, haloformyl and mixtures thereof. Specific examples include trimellitic acid, trimellitic anhydride, trimellitic trichloride, tris-p-hydroxy phenyl ethanol, isatin-bis-phenol, tris-phenol TC (1,3,5-tris((p-hydroxyphenyl) isopropyl)benzene), tris-phenol PA (4(4(1,1-bis(p-hydroxyphenyl)ethyl)alpha, alpha-dimethyl benzyl)phenol), 4-chloroformyl phthalic anhydride, trimesic acid and benzophenone tetracarboxylic acid. The branching agent may be added at a level of about 0.05–2.0 weight percent. Branching agents and procedures for making branched polycarbonates are described in U.S. Pat. Nos. 3,635,895; 4,001, 184; and 4,204,047, which are incorporated by reference.

All types of polycarbonate end groups are contemplated as being within the scope of the present invention.

Preferred aromatic polycarbonates are bisphenol A polycarbonates.

The most preferred aromatic carbonate is a homopolymer derived from 2,2-bis(4-hydroxyphenyl)propane (bisphenol-A) and phosgene or from 2,2-bis(4-hydroxyphenyl)propane (bisphenol-A) and diphenyl carbonate, both commercially available under the trade designation LEXAN Registered TM from General Electric Company.

Additionally, the composition of the present invention may include other ingredients, such as glass fibers, flame retardants, stabilizers, lubricants, colorants, plasticizers, nucleants, antioxidants and UV absorbers. Preferably, these ingredients are added in low amounts, typically less than about 5 percent by weight of the total composition.

Best results are obtained when the ingredients are precompounded, pelletized and then molded. Precompounding can be carried out in conventional equipment, such as a manual mixer or a Papenmeier TGHK40 mixer and the dry blend fed into an extruder, such as a Werner & Pfleiderer extruder or a Leistritz twin screw extruder. Portions of the blend can be precompounded and then, extruded with the remainder of the formulation, and cut or chopped into molding compounds, such as conventional granules, pellets, etc. by standard techniques.

Markings are carried out on the resin compositions by means of laser irradiation. Various lasers may be used, including a carbon dioxide laser and an Nd:YAG laser. The settings for the laser depend on the type of laser used, the markings, the speed with which the markings will be applied and the composition. Some examples of laser settings are shown in the Examples.

The present invention also encompasses articles of the compositions. A preferred article of the present invention is electrical switches.

The present invention is explained in more detail in the following Examples, but it should be recognized that the scope of the present invention is not restricted to these Examples.

EXAMPLES

Reference Examples A, B and C and Examples 1 and 2 were prepared by blending a polycarbonate resin (PC-125, molecular weight of about 23,300) as shown in Table 1, 1% by weight of methylmethacrylate butadiene styrene copolymer, 0.5% by weight of pentaerythritol stearate, 0.1% by weight of I168 (a stabilizer from Ciba Geigy), 0.05% by weight of Irganox 1076 (an antioxidant from CIBA) and the color additives shown in Table 1 in a manual mixer and extruding the samples on a Werner & Pfleiderer extruder at a temperature of 270° C. The extrudate was cooled through a water bath prior to pelletizing. Test parts were injection molded on a Demag injection molding machine with a set temperature of 290° C. The resin was dried for two hours at 120° C. in a forced air circulating oven prior to injection molding. Each sample was molded into a plaque of 10 cm diameter. An Nd:YAG laser was used to irradiate the samples with the settings shown in Table 1. The patterns used to test the laser marking were "GE Plastics" logos in different sizes, filled in 10×10 mm boxes and lines of different thicknesses.

Table 1 shows the differences in the black background color of different samples used for laser marking of color or white on black. The laser used was an Nd:YAG 1064/532 nm Carl Baasel laser. The laser settings with best results are mentioned. Each sample was placed next to a black background reference and viewed from a distance of 1 meter to determine if there was discoloration in the black background color or in the laser marked area. The results are visual conclusions from three people.

TABLE 1

| Examples | Polycarbonate (% by weight) | Color Additive (% by weight) | Laser Setting | Background at 1 m Distance | Contrast in Laser Marked Area |
|---|---|---|---|---|---|
| Ref. A | 98.00% | 0.15% Carbon Black[1] 0.20% Solvent yellow 63 | 10 A 3000 Hz | Hardly distinguishable from black without dye | Poor |
| Ref. B | 98.10% | 0.05% Carbon Black[1] 0.20% Solvent yellow 63 | 11 A 10,000 Hz | Yellowish in comparison to black without dye | Good |
| 1 | 97.92% | 0.03% Carbon Black[1] 0.20% Solvent yellow 63 0.20% Copper Chromite[2] | 11 A 10,000 Hz | Hardly distinguishable from black without dye | Good |
| Ref. C | 97.75% | 0.10% Carbon Black[1] 0.50% Iriodin LS830[3] | 12 A 8000 Hz | Black | Poor (grey) |

TABLE 1-continued

| Examples | Polycarbonate (% by weight) | Color Additive (% by weight) | Laser Setting | Background at 1 m Distance | Contrast in Laser Marked Area |
|---|---|---|---|---|---|
| 2 | 97.35% | 1.0% Copper Chromite[2] | 12 A 8000 Hz | Black | Good (White) |
| 3 | 97.92% | 0.03% Carbon Black[1] 0.2% Macrolex Blue 3R[4] 0.2% Copper Chromite Spinel[2] | 11 A 10,000 Hz | Hardly distinguishable from black without dye | Good |

[1]Pigment Black 7 (Printex 95 from Degussa)
[2]Pigment Black CDT 1145 supplied by FERRO
[3]Iriodin is a pearl luster pigment supplied by Merck.
[4]Macrolex Blue 3R supplied by Bayer As can be seen from Table 1, Reference Examples A and C have a high loading of Carbon Black (over 0.05% by weight) which produces a good black background, but distorts the yellow and pearl luster pigments in the laser marked areas. Reference Example B has a lower amount of Carbon Black (0.05% by weight), which provides a good contrast for the yellow pigment, but allows the yellow pigment to show through the black background color.

Examples 1 and 3, illustrating the claimed invention, contain a copper chromite having a spinel structure and carbon black at less than 0.05% by weight of the total composition. These Examples have a black background color and good contrast between the yellow or blue laser markings against the black background with no discoloration.

Example 2, illustrating the claimed invention, contains a copper chromite having a spinel structure without a dye or pigment for the marking agent. This Example has a black background color and a good contrast between the white laser markings against the black background with no discoloration.

Reference Examples D–O and Examples 3–6 were prepared by blending a polycarbonate resin (PC-125, molecular weight of about 23,300) as shown in Table 2, 1% by weight of methylmethacrylate butadiene styrene copolymer, 0.5% by weight of pentaerythritol stearate, 0.1% by weight of 1168 (a stabilizer from Ciba Geigy), 0.05% by weight of Irganox 1076 (an antioxidant from CIBA) in a manual mixer and extruding the samples on a Werner & Pfleiderer extruder at a temperature of 270° C. The extrudate was cooled through a water bath prior to pelletizing. Test parts were injection molded on a Demag injection molding machine with a set temperature of 290° C. The resin was dried for two hours at 120° C. in a forced air circulating oven prior to injection molding. Each sample was molded into a plaque of 10 cm diameter. The laser used was an Nd:YAG 1064/532 nm Carl Baasel laser. The patterns used to test the laser marking were "GE Plastics" logos in different sizes, filled in 10×10 mm boxes and lines of different thicknesses.

Table 2 shows the results. The L-ratio was performed on a Macbeth 20/20 visual spectrophotometer and is the ratio of L-white/L-black. Higher values of L-ratios are preferred. The laser quality indicates the clarity of the lettering and lines in the laser marking. Each sample was placed next to a black background reference and viewed from a distance of 1 meter by three people to determine if there was discoloration in the black background color or in the laser marked area. The desired background color is black and the desired laser marking color is white.

TABLE 2

| Examples | PC (% by weight) | Color Additive (% by weight) | L-ratio | Laser Marking Speed (mm/s) | Laser Marking Quality | Laser Marking Color | Background Color |
|---|---|---|---|---|---|---|---|
| Ref. D | 98.35% | N/A | N/A | 400 | Good | Black | White |
| Ref. E | 98.15% | 0.2% Copper Chromite Spinel[1] | 4.7 | Too slow | Poor | White/Gray | Gray |
| 3 | 97.85% | 0.5% Copper Chromite Spinel[1] | 5.5 | 150 | Good | White | Black |
| 4 | 97.35% | 1.0% Copper Chromite Spinel[1] | 7.3 | 450 | Good | White | Black |
| Ref. F | 98.15% | 0.2% Copper, Manganese, Iron Chromite Spinel[2] | N/A | Not molded | Not molded | Not molded | Black |
| Ref. G | 97.85% | 0.5% Copper, Manganese, Iron Chromite Spinel[2] | 0.2 | Too slow | Poor | Silver/Gray | Black |
| Ref. H | 97.35% | 1.0% Copper, Manganese, Iron Chromite Spinel[2] | 0.2 | Too slow | Poor | Silver/Gray | Black |
| Ref. I | 98.15% | 0.2% Copper, Iron, Cobalt Chromite Spinel[3] | 4.6 | Too slow | Poor | White | Black |
| Ref. J | 97.85% | 0.5% Copper, Iron, Cobalt Chromite Spinel[3] | 6.7 | 200 | Good | White | Black |
| Ref. K | 97.35% | 1.0% Copper, Iron, Cobalt Chromite Spinel[3] | 7.9 | 350 | Good | Silver/White | Black |
| Ref. L | 98.15% | 0.2% Copper, Iron, Manganese Spinel[4] | 5.1 | 125 | Poor | White | Gray |
| Ref. M | 97.85% | 0.5% Copper, Iron, Manganese Spinel[4] | 7.2 | 300 | Markings on fine print were truncated and not clearly defined. | White | Black |

TABLE 2-continued

| Examples | PC (% by weight) | Color Additive (% by weight) | L-ratio | Laser Marking Speed (mm/s) | Laser Marking Quality | Laser Marking Color | Background Color |
|---|---|---|---|---|---|---|---|
| Ref. N | 97.35% | 1.0% Copper, Iron, Manganese Spinel[4] | 7.6 | 250 | Good | White | Black |
| Ref. O | 98.15% | 0.2% Copper Chromite Spinel[5] | 4.9 | Too slow | Poor | White | Gray |
| 5 | 97.85% | 0.5% Copper Chromite Spinel[5] | 7.5 | 300 | Good | White | Black |
| 6 | 97.35% | 1.0% Copper Chromite Spinel[5] | 9.1 | 375 | Good | White | Black |

[1]Pigment Black CDT 1145 supplied by FERRO
[2]Pigment PK3097 supplied by FERRO
[3]Pigment PK3095 supplied by FERRO
[4]Pigment PK3060 supplied by FERRO
[5]Black #1 supplied by Shepherd Color Company As can be seen from Table 2, Reference Examples E–N contain a different type of background pigment from the claimed invention. These compositions do not produce the desired combination of properties of good speed, good laser marking quality or good contrast of white laser markings on a black background. Reference Examples E and O contain a copper chromite spinel pigment, but at levels below 0.5% by weight. Examples 3–6, illustrating the claimed invention, have good laser quality with good contrast between the black background and the white laser markings. Examples 5 and 6 also have superior laser marking speed, which is preferred at higher production levels.

What is claimed is:

1. A resin composition having laser marking properties comprising a polycarbonate resin, a copper chromite having a spinel structure and up to about 0.05% by weight of the total composition of a carbon black, wherein said polycarbonate resin foams in laser struck areas to form light colored markings in the laser struck areas on a dark background.

2. The resin composition having lasor marking properties according to claim 1, further comprising a marking agent.

3. The resin composition having laser marking properties according to claim 2 wherein said marking agent is a dye or pigment present in an amount up to about 1% by weight of the composition.

4. The resin composition having laser marking properties according to claim 2 wherein said marking agent is a dye or pigment present in an amount from about 0.001% to about 1.0% by weight of the composition.

5. The resin composition having laser marking properties according to claim 2 wherein said marking agent is a dye or pigment present in an amount from about 0.1% to about 0.3% by weight of the composition.

6. The resin composition having laser marking properties according to claim 2, wherein said dye is selected from the group consisting of: pigment yellow 180, solvent yellow 145, solvent yellow 163, solvent yellow 114 and solvent red 135, solvent violet 122, solvent blue 97, solvent green 3, pigment green 7, solvent violet 36, solvent violet 13 and pearl luster pigment.

7. The resin composition having laser marking properties according to claim 1 wherein said copper chromite spinel is present in an amount of at least about 0.5% by weight of the total composition.

8. The resin composition having laser marking properties according to claim 1 wherein said copper chromite spinel is present from about 0.5% to 5% by weight of the total composition.

9. The resin composition having laser marking properties according to claim 1 wherein said copper chromite spinel is present from about 0.7% to about 1% by weight of the total composition.

10. The resin composition having laser marking properties according to claim 1 wherein said carbon black is present in the amount of about 0.001% to about 0.05% by weight of the total composition and the copper chromite spinel is present in an amount from about 0.1% to about 5% by weight of the total composition.

11. The resin composition having laser marking properties according to claim 1 wherein said carbon black is present in the amount of about 0.025% to about 0.035% by weight of the total composition and the copper chromite spinel is present in an amount from about 0.2% to about 1% by weight of the total composition.

12. The resin composition having laser marking properties according to claim 1 wherein said polycarbonate resin is of the following formula:

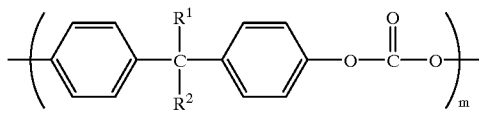

wherein R1 and R2 are independently hydrogen, alkyl containing 1–6 carbon atoms, or phenyl and m is preferably between 30 and 300.

13. The resin composition having laser marking properties according to claim 1 wherein said polycarbonate resin is a bisphenol A polycarbonate.

14. The article molded from the resin composition of claim 1.

15. The resin composition having laser marking properties according to claim 1 wherein the background color consists of the copper chromite having a spinel structure.

16. The resin composition having laser marking properties according to claim 1 wherein said composition further comprises up to 5% by weight of the composition of one or more additional ingredients selected from the group consisting of: glass fibers, flame retardants, stabilizers, lubricants, colorants, plasticizers, nucleants, antioxidants and UV absorbers.

17. The composition having laser marking properties according to claim 16 wherein said copper chromite spinel is present in an amount of at least about 0.5% by weight of the total composition.

18. The resin composition having laser marking properties according to claim 16 wherein said copper chromite spinel is present from about 0.5% to 5% by weight of the total composition.

19. A resin composition having laser marking properties according to claim 16 wherein said copper chromite spinel is present from about 0.7% to about 1% by weight of the total composition.

20. The resin composition having laser marking properties according to claim 1, wherein said copper chromite is about 0.05% to about 5% by weight of the total composition.

21. A method of marking a polycarbonate composition by exposing the polycarbonate composition to laser radiation from an Nd:YAG laser, said composition comprises a polycarbonate resin, a copper chromite having a spinel structure and up to about 0.05% by weight of a carbon black based on the composition, wherein said polycarbonate resin foams in laser struck areas to form light colored markings in the laser struck areas on the dark background coloration.

22. The method according to claim 21, wherein the copper chromite is about 0.05% to about 5% by weight of the total composition.

\* \* \* \* \*